US010929048B2

(12) United States Patent
Srinivasan et al.

(10) Patent No.: US 10,929,048 B2
(45) Date of Patent: Feb. 23, 2021

(54) DYNAMIC MULTIPLE PROXY DEPLOYMENT

(71) Applicant: EMC IP Holding Company LLC, Hopkinton, MA (US)

(72) Inventors: Sharath Talkad Srinivasan, Bangalore (IN); Shahid Paloth Parambil, Bangalore (IN); Rakesh Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 16/148,102

(22) Filed: Oct. 1, 2018

(65) Prior Publication Data

US 2020/0104050 A1    Apr. 2, 2020

(51) Int. Cl.
*G06F 12/00* (2006.01)
*G06F 13/00* (2006.01)
*G06F 3/06* (2006.01)
G06F 9/455 (2018.01)

(52) U.S. Cl.
CPC .............. *G06F 3/065* (2013.01); *G06F 3/067* (2013.01); *G06F 3/0619* (2013.01); *G06F 3/0664* (2013.01); *G06F 9/45541* (2013.01)

(58) Field of Classification Search
CPC ...... G06F 3/065; G06F 3/0619; G06F 3/0664; G06F 3/067; G06F 9/45541
USPC ....................................................... 711/162
See application file for complete search history.

(56) References Cited

U.S. PATENT DOCUMENTS

| | | | | |
|---|---|---|---|---|
| 6,393,478 B1* | 5/2002 | Bahlmann | ............... | H04L 41/22 709/224 |
| 6,549,932 B1* | 4/2003 | McNally | ............... | G06F 9/4862 709/202 |
| 7,240,102 B1* | 7/2007 | Kouznetsov | ...... | H04L 29/12216 709/220 |
| 8,453,145 B1* | 5/2013 | Naik | .................... | G06F 9/45558 718/1 |
| 8,464,250 B1* | 6/2013 | Ansel | .................. | G06F 9/45504 718/1 |
| 8,793,684 B2* | 7/2014 | Breitgand | ........... | G06F 9/45558 718/1 |
| 9,183,028 B1* | 11/2015 | Brandwine | ......... | H04L 67/2823 |
| 9,305,147 B1* | 4/2016 | Azmat | .................. | G06F 21/121 |
| 9,495,188 B1* | 11/2016 | Ettema | ................ | G06F 9/45533 |
| 9,565,341 B2* | 2/2017 | Oosawa | ................ | H04N 5/2251 |
| 9,628,561 B1* | 4/2017 | Kulkarni | ............. | G06F 11/1464 |
| 9,860,208 B1* | 1/2018 | Ettema | .................. | G06F 21/602 |

(Continued)

*Primary Examiner* — Sheng Jen Tsai
(74) *Attorney, Agent, or Firm* — Staniford Tomita LLP

(57) ABSTRACT

Dynamically generating proxy virtual machines (VMs) in a virtual center (vCenter) serving a backup server, by deploying a source proxy VM by passing network data to the vCenter, passing a set of internet protocol (IP) addresses and network configuration information to the vCenter to be used by the dynamically generated proxy VMs, receiving an indication from the backup server that new proxy VMs are required, and performing, in the vCenter, an instant clone operation to spawn one or more new proxy VMs. The method may further comprise passing the IP address and network configuration information for the new proxy VMs to the backup server for registration within the backup server, and using the new proxy VMs for backup operations of the backup server.

19 Claims, 8 Drawing Sheets

(56) References Cited

U.S. PATENT DOCUMENTS

| | | | |
|---|---|---|---|
| 9,882,929 B1* | 1/2018 | Ettema | H04L 63/145 |
| 10,044,675 B1* | 8/2018 | Ettema | H04L 63/0227 |
| 10,116,700 B2* | 10/2018 | Ylonen | H04L 63/062 |
| 10,223,145 B1* | 3/2019 | Neogy | H04L 67/24 |
| 10,404,661 B2* | 9/2019 | Ettema | G06F 9/45558 |
| 2008/0072229 A1* | 3/2008 | Kirton | G06F 9/5061 |
| | | | 718/104 |
| 2009/0034540 A1* | 2/2009 | Law | H04L 12/462 |
| | | | 370/400 |
| 2009/0094673 A1* | 4/2009 | Seguin | G06F 21/51 |
| | | | 726/1 |
| 2009/0168787 A1* | 7/2009 | Ansari | H04L 12/66 |
| | | | 370/401 |
| 2010/0070725 A1* | 3/2010 | Prahlad | G06F 11/1453 |
| | | | 711/162 |
| 2010/0131948 A1* | 5/2010 | Ferris | G06F 9/50 |
| | | | 718/1 |
| 2011/0154331 A1* | 6/2011 | Ciano | G06F 9/45558 |
| | | | 718/1 |
| 2012/0110574 A1* | 5/2012 | Kumar | G06F 9/45558 |
| | | | 718/1 |
| 2012/0185563 A1* | 7/2012 | Sugiyama | H04L 12/4641 |
| | | | 709/217 |
| 2012/0246640 A1* | 9/2012 | Marshall | G06F 9/45558 |
| | | | 718/1 |
| 2013/0185716 A1* | 7/2013 | Yin | G06F 9/45558 |
| | | | 718/1 |
| 2014/0068022 A1* | 3/2014 | Kshirsagar | H04L 41/0806 |
| | | | 709/220 |
| 2014/0095816 A1* | 4/2014 | Hsu | G06F 3/0655 |
| | | | 711/162 |
| 2014/0095817 A1* | 4/2014 | Hsu | G06F 11/1438 |
| | | | 711/162 |
| 2014/0137272 A1* | 5/2014 | Baset | G06F 21/554 |
| | | | 726/32 |
| 2014/0380007 A1* | 12/2014 | Suen | G06F 3/0604 |
| | | | 711/162 |
| 2015/0180892 A1* | 6/2015 | Balderas | H04L 63/1416 |
| | | | 726/11 |
| 2015/0324260 A1* | 11/2015 | Mutalik | G06F 9/45558 |
| | | | 714/703 |
| 2015/0365281 A1* | 12/2015 | Marino | G06Q 30/04 |
| | | | 709/223 |
| 2016/0378527 A1* | 12/2016 | Zamir | G06F 9/45558 |
| | | | 711/162 |
| 2016/0378528 A1* | 12/2016 | Zamir | G06F 9/45558 |
| | | | 711/162 |
| 2017/0090992 A1* | 3/2017 | Bivens | G06F 9/5077 |
| 2017/0220592 A1* | 8/2017 | Foltz | G06F 3/0613 |
| 2017/0366606 A1* | 12/2017 | Ben-Shaul | H04L 67/1097 |
| 2018/0004555 A1* | 1/2018 | Ramanathan | G06F 9/45558 |
| 2018/0032372 A1* | 2/2018 | Devendran | G06F 13/20 |
| 2018/0159844 A1* | 6/2018 | Barfonchovski | H04L 63/0823 |
| 2018/0253192 A1* | 9/2018 | Varadharajan | G06F 16/188 |
| 2019/0068547 A1* | 2/2019 | Mitchell | H04L 45/42 |

\* cited by examiner

DYNAMIC MULTIPLE PROXY DEPLOYMENT

TECHNICAL FIELD

Embodiments are generally directed to data backup and recovery in virtual hard disk (VHD) networks, and more specifically to dynamically deploying multiple proxy virtual machines.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) backup and disaster recovery systems using hypervisor platforms, such as vSphere from VMware or Hyper-V from Microsoft, among others, have been developed to provide recovery for various different needs, such as data migration, disaster recovery, regular scheduled backups (hourly, daily, etc.), and so on. Popular backup platforms (e.g., EMC Networker or Avamar) support backups of volumes and files in a virtual hard disk (VHD or VHDx) format.

To help scale up backup systems, backup proxies are often used. A backup proxy is a component that typically resides between the backup server and other components of the backup infrastructure. In a virtual environment, proxies may be referred to as virtual proxies or vProxies. The backup server administers tasks while the proxy processes jobs and delivers backup traffic. Proxy tasks include retrieving VM data from the production storage; compressing, deduplicating and encrypting the data; and transmitting the data to storage repositories. Any practical number of proxies may be deployed depending on system constraints and requirements. A user can usually deploy backup proxies both in the primary site and in remote sites, and deployment usually requires adding a Windows-based (or other OS) server to the backup system and assigning the role of a backup proxy to the added server. Backup proxies usually run lightweight services that take are quick to deploy.

Present proxy deployment methods, however, present significant disadvantages. For example, the implementation of proxy deployment in current systems is not dynamic or fast. The number of backup proxy appliances needed in a virtual center (vCenter) of many VMs needs to be agreed upon by the user in the initial stage of deployment so that the backup server can deploy them for the user. This number can be based on an initial number of VMs to be protected in the datacenter and may go up later, by which time this initial number of proxies may be insufficient to complete the backups in the specified backup window. In current systems, deploying more proxies to take up the VM's in queue requires triggering a proxy template import process. This generally takes a lot of time and consequently, some VM's in the queue may timeout and miss the backup window. Also, the new proxies take up hypervisor (e.g., ESXi) resources exclusively, which may bring down datacenter performance.

What is needed, therefore, is a system and method that reduces the time needed to deploy multiple proxies, and increase the backup and recovery operation performance by scaling multiple deployment of the proxies dynamically as needed, and without the help of the backup server resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Avamar, Data Domain, and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
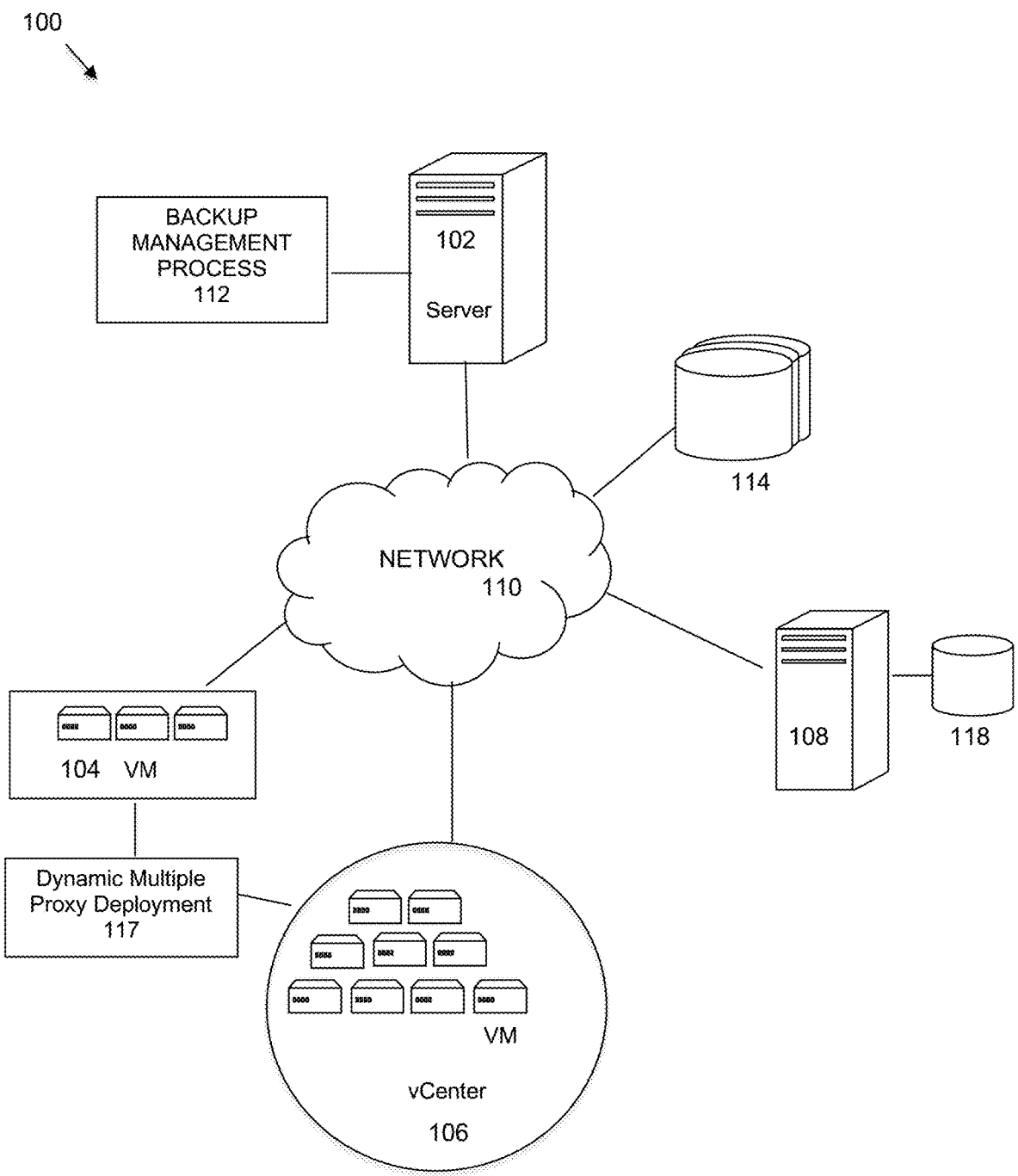
FIG. 1 is a diagram of a large-scale network implementing a simultaneous file level recovery process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a dynamic multiple proxy deployment process in a backup system. In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. In an embodiment, system 100 may represent a Data. Domain Restorer (DDR)-based deduplication storage system, and storage server 128 may be implemented as a DDR Deduplication Storage server provided by EMC Corporation. However, other similar backup and storage systems are also possible.

As is known, virtual machine environments utilize hypervisors (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest operating systems, typically by using an API.

In an embodiment, system 100 represents a backup platform (e.g., EMC Networker) that supports backups of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. A VHD is generally a file format that represents a virtual hard disk drive (HDD). It may contain what is found on a physical HDD, such as disk partitions and a file system, which in turn can contain files and folders.

FIG. 1 is a diagram of a large-scale network implementing a multiple proxy deployment method, under some embodiments. The vProxy is a proxy VM process or component and generally refers to a newer version of a VMware Backup Appliance (VBA) and supports a number of recoveries, including non-admin File Level Recovery (FLR) and Instant Access which enables immediate access to virtual machines on a Data Domain system.

The dynamic multiple proxy deployment process 117 is executed as part of a VM 104 or vCenter 106. The vProxy deployment process is executed in the vCenter on the backup server's request. Also, an instant clone feature is also available in the vCenter. In an embodiment, the deployment process is initiated from the backup server 102 and the recover process runs in the vProxy. The networker server acts as an orchestrator for the entire recover workflow. Once the mount operation is completed successfully, the user is notified through an appropriate user interface (UI). Then user logs in to the target VM and does a search on the attached file system and copies the required files to the target VM. The vProxy (proxy VM) is the VM that communicates instructions from one process to another.

Figure 2:
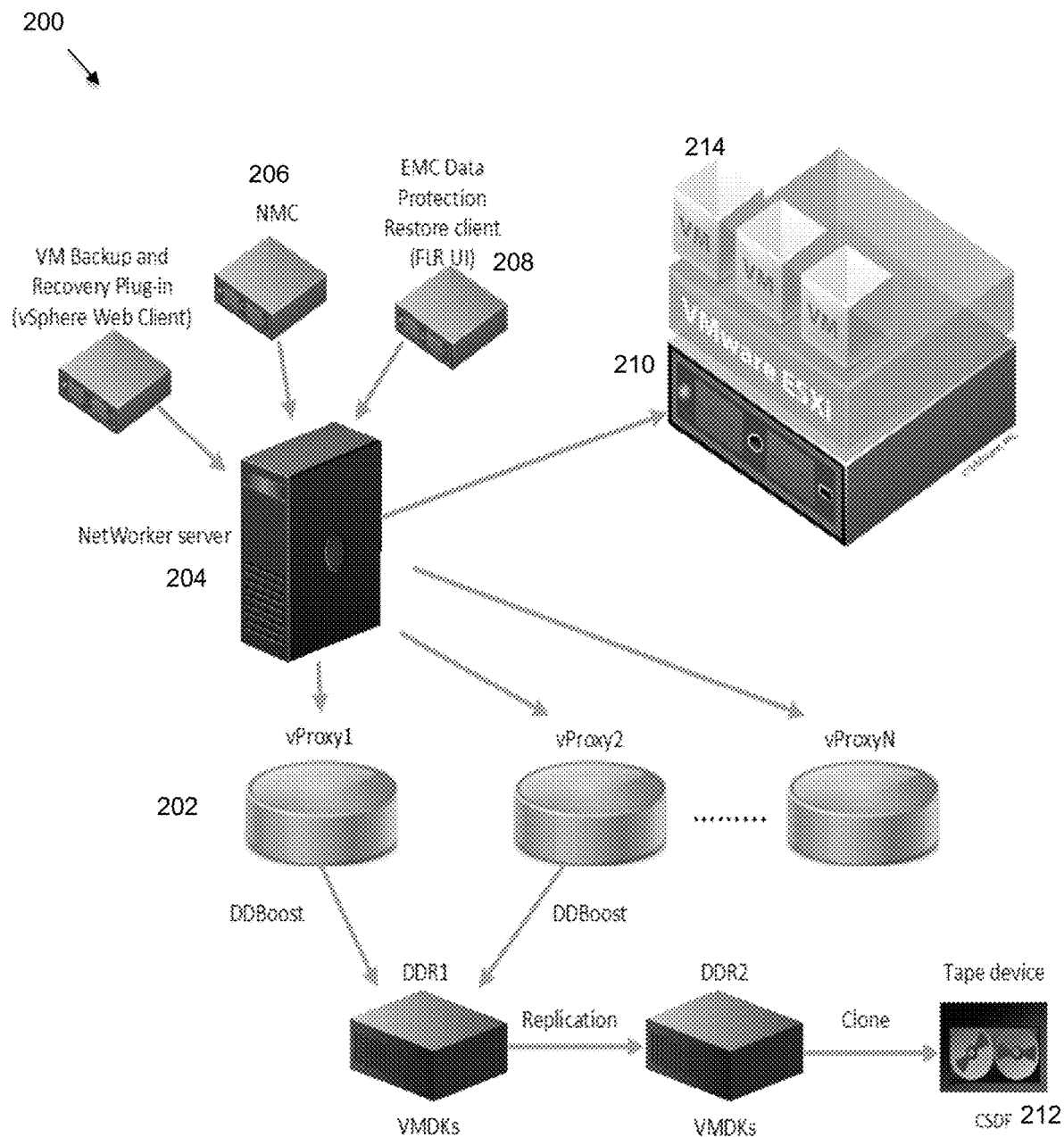
FIG. 2 illustrates a Networker VMware protection system using dynamic vProxy deployment, under some embodiments.

FIG. 2 illustrates a Networker VMware protection system using dynamic vProxy deployment, under some embodiments. For system 200 of FIG. 2, the vProxy appliances 202 provide the data movement services between the VMware host 210 and the target protection storage, for example Data Domain. The NetWorker server 204 provides the ability to manage vProxy appliances 202, and configure data protection policies for backup and clone operations. The NMC server 206 provides the ability to start, stop, and monitor data protection policies and perform recovery operations. In an embodiment, the EMC Data Protection Restore client UI 208 provides the ability to perform file level recovery (FLR) by using a web interface for the user. The DDR1 and DDR2 Data Domain appliances receive and clone backup data in SSDF format, and tape device 212 is the storage media that receives backup data in CDSF (CD file system) format, in an example implementation. FIG. 2 is meant to illustrate only one example of an application suitable for use with a dynamic proxy deployment system and method, and other applications and network environments may also be used.

In an embodiment, server 210 runs the VMware ESXi process that maintains and controls the virtual machines 214, where ESXi is a bare-metal hypervisor that is installed directly onto the server, though embodiments are not so limited.

As shown in FIG. 2, any number of vProxies (1 to N) can be deployed depending on system constraints and backup workloads. Present deployment methods typically involve a user accessing a proxy deploy management (PDM) console, which then recommends the number of proxies required to manage the entire virtual center. This recommendation is calculated based on a formula. However it is solely on the user to accept the recommendations and deploy the proxies. Once the user agrees to deploy the recommended number of vProxies. The backup server deploys them by using the vProxy open virtual appliance (OVA) package present in the backup bundle. This process is equivalent to deploying multiple vProxies using OVA, which is very time consuming and the deployment takes a lot of backup servers performance cycle. For example, a backup server may communicate a minimum of six times for each vProxy open virtual appliance (OVA) to be deployed. Also when the number of virtual machines in the virtual center increases, the user must manually check for the recommendations and deploy more proxies as recommended by the PDM to manage the VMs.

Some of the issues associated with the present methods of deploying multiple vProxies are: non-dynamic deployment relying on user acceptance of PDM recommended number; performance degradation if the user ignores the recommendation; need for user to pass all network configuration details for each proxy deployment every time; need for manual deletion of proxies if the PDM recommends downsizing the number of proxies; excessive number of CPU cycles to communicate each proxy deployment; and every deployment is OVA-based and involves the overhead of a full disk import, power-on, boot, network configuration, and registration. In an embodiment, the OVA package is an archive file with the OVF (open virtualization format) directory inside, where OVF is an open standard for packaging and distributing virtual appliances, or software to be run in VMs.

Embodiments of the dynamic multiple deployment process 117 addresses these problems by providing a faster and efficient method to spin up more proxies as required and take up the backup workload. A method like VM forking is used, which is referred to as "instant clone." It is actually "parentless" instant clone, as the instantiated VM no longer depends on the source VM. Once instantiated, the instant clone is an independent VM that starts executing from the exact running state of the source VM, which enables rapid provisioning of VMs that are immediately available for consumption, unlike traditional full clones. This instant provisioning is made possible by sharing both the memory and disk state of the source VM. From a memory standpoint, all Instant Clones will share the same physical memory pages as its source VM. In an embodiment, the instant clone feature is provided by the vSphere product from VMware Corp., though embodiments are not so limited. Any similar instant clone process or service/product may be used.

Figure 3:
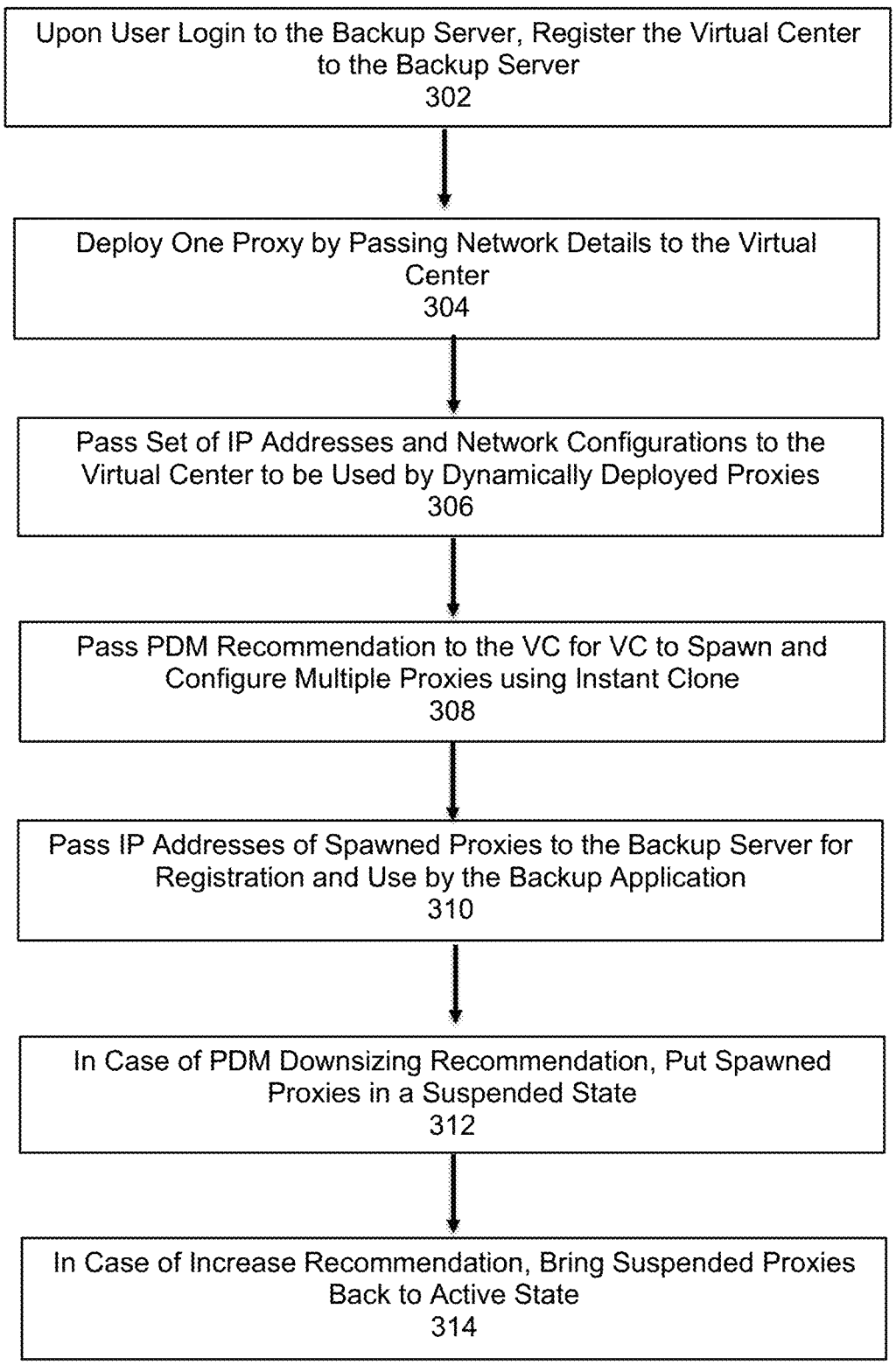
FIG. 3 is a flowchart that illustrates a method of dynamically deploying multiple proxies, under some embodiments.

In an embodiment, the vProxy bundle comes bundled with the backup server packages when the backup server is deployed and the first vProxy on the vCenter is deployed by using the vProxy OVA initiated by the backup server. Using this vProxy, multiple clone vProxies are instantly brought up using an instant clone feature in the vCenter. FIG. 3 is a flowchart that illustrates a method of dynamically deploying multiple proxies, under some embodiments. As shown in FIG. 3, the process begins with the user registering the vCenter to the backup server upon user login to the backup server, step 302. One vProxy is then deployed by passing the network details on to the vCenter, step 304. The process 117 passes a set of IP addresses and network configuration information to the vCenter, step 306, which will be used by the proxies deployed dynamically in the vCenter using the instant clone feature. As and when the PDM has a new recommendation, in step 308, the recommendation is passed to the vCenter and the vCenter performs an instant clone of the first vProxy deployed in step 304, and instantly spawns multiple proxies (typically within a few seconds) and configures the network configuration for these VMs accordingly by using the information passed in step 306. The process then passes the IP addresses to the backup server, which can register these proxies dynamically to perform any backup and recover operations to and from the backup server, step 310.

Figure 4:
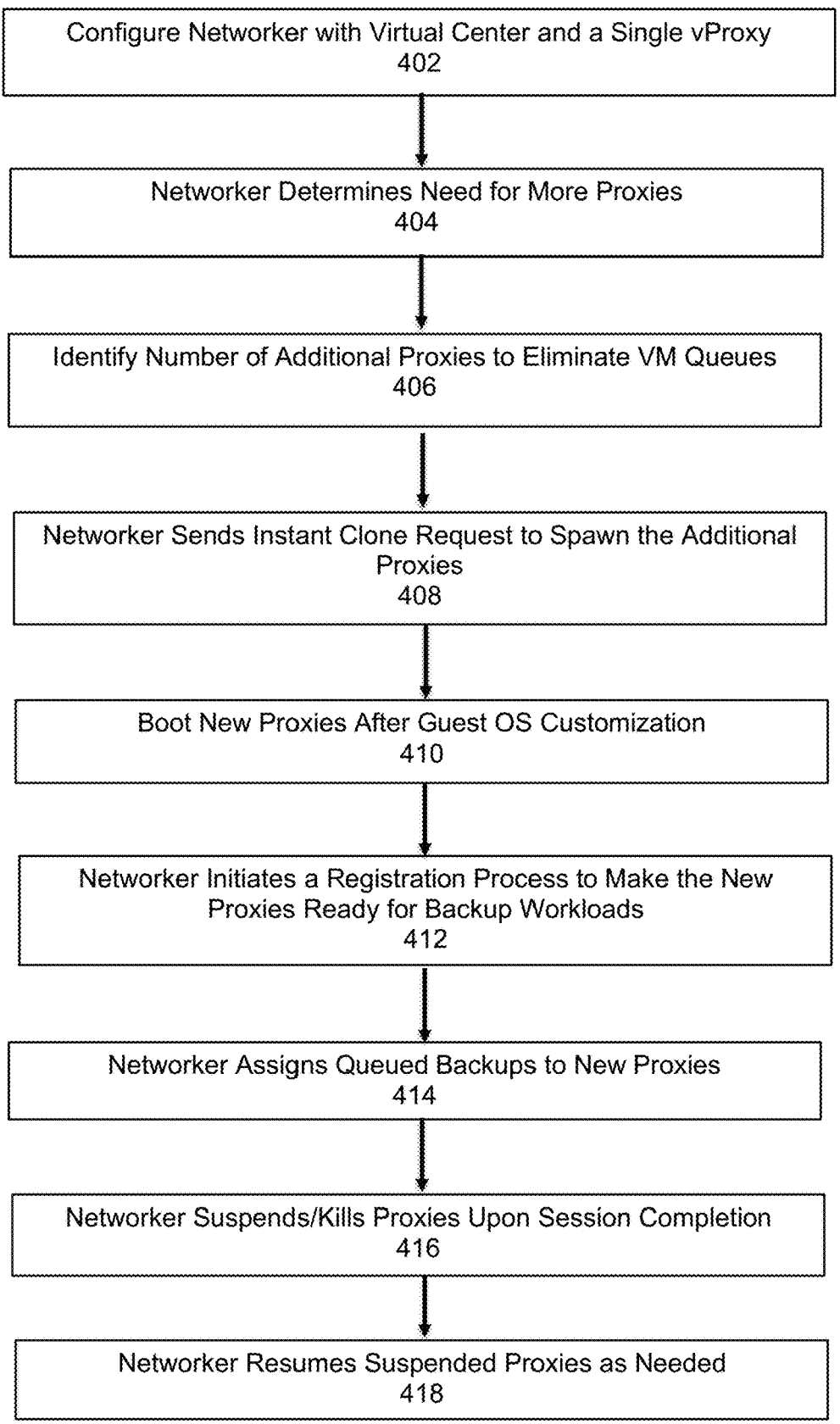
FIG. 4 is a flowchart that illustrates a method of implementing a dynamic multiple proxy deployment process in a deduplicated backup system, under some embodiments.

In case the PDM recommends downsizing the number of proxies deployed, the process just puts the spawned proxies in a suspended state, which will release all the resources held by those proxies, step 312. The same proxies can then be brought back to active state as and when the PDM recommends providing more available proxies, step 314. The processing method of FIG. 4 provides dynamic implementation of the proxies in the backup server by minimizing the resource consumption when the proxies are not in use.

As described and illustrated in FIGS. 1 and 2, the dynamic multiple proxy deployment process can be used in a deduplicated backup system, such as an EMC Networker backup environment, or similar. FIG. 4 is a flowchart that illustrates a method of implementing a dynamic multiple proxy deployment process in a deduplicated backup system, under some embodiments. Although specific reference is made to the Networker deduplication backup system, embodiments are not so limited, and other similar backup systems may be used.

In an embodiment, the number of vProxies needed is calculated based on the number of active jobs as determined or provided by the proxy deployment manager (PDM), such as through a defined prediction formula based on external predefined parameters. The PDM offers a recommendation as to the number of proxies that should be deployed in each vCenter, and a recommended host location for each proxy. When generating a recommendation, the PDM performs a static point-in-time analysis of the virtual infrastructure. This analysis gathers data about the virtual infrastructure, such as the number of virtual machines, the number of datastores, and the number of virtual machines hosted in each datastore. Users can specify a data change rate and backup window duration for their site. The PDM then calculates the optimum number of proxies required to back up those virtual machines in the time allotted by the backup window. The PDM also considers the datastore and hypervisor host topology, and suggests an optimal host location for each proxy so that all datastores are protected. This calculated proxy deployment topology is offered to the user as a recommendation, and can be accepted as offered, or modified to meet specific site requirements. Before proxies can be deployed, each recommended proxy must be configured by specifying: proxy name, server domain where the proxy will reside, proxy IP address, datastore assignment, network setting, the existing virtual network to use, DNS server(s), Network gateway, and Network mask. After all proxies are configured, proxy virtual machines are created with the specified configuration settings.

Factors or significant changes to the virtual infrastructure that influence the recommended number of proxies include the data change rate and the proxy data ingestion rate. The data change rate is the percentage of a client file system that actually changes between backups. Data change rates directly impact the number of proxies required to successfully back up all required virtual machines in the time allotted by the backup window. More data to be backed up requires more time, more proxies, or both. Even though empirical field data routinely reports client data change rates of 3-4% per day, by default the PDM may assumes a client data change rate of, for example, 12% per day. The intentionally conservative use of 12% as a design assumption provides a buffer. If client data change rates are routinely lower or higher than these assumed values, proxies can be added or deleted as needed.

Proxy data ingestion rate is another parameter that directly impacts the number of proxies required to successfully back up all required virtual machines in the time allotted by the backup window. By default, the PDM assumes that each proxy can run, for example, 8 concurrent backup jobs and process 500 GB of data per hour. While an assumed proxy data ingestion rate of 500 GB per hour is a conservative estimate, a number of factors at each customer site directly affect the actual proxy data ingestion rate. Some of these factors are the: server architecture (e.g., physical server using a Data Domain system for back end storage versus a virtual server hosted in vCenter), the type of storage media used for proxy storage, network infrastructure and connectivity speed, SAN infrastructure, and connectivity speed. If proxy data ingestion rates are routinely lower or higher than the default amount (e.g., 500 GB per hour), proxies can be added or deleted as needed.

As shown in FIG. 4, the process starts with Networker being configured with a vCenter to protect and a single vProxy, step 402. In step 404, the Networker program determines that there is a need for more backup proxies, such as by observing many backup operations getting queued, and/or many misses or time outs. Based on the number of VM's getting queued (e.g., through historic data), a proxy number is identified, which is the number (N) required to eliminate any VM queues, step 406. For example, if one vProxy can handle 25 backup sessions, and if 100 backups are queued, then there is need for four additional vProxies.

In step 408, the Networker program sends an instant clone request to the vSphere API interface to spawn the required number (N) of new proxies, with the source VM being the existing vProxy in the datacenter. The new vProxies boot up after a guest OS customization operation, step 410. Networker then initiates a registration process and the proxies are then ready for backup workloads, step 412. Networker then assigns queued backups to new proxies, step 414. Once the Backup sessions are complete, Networker can suspend the proxies/or kill them, depending on need, step 416. If necessary, suspended proxies can be resumed or they can be forked again, step 418.

Figure 5:
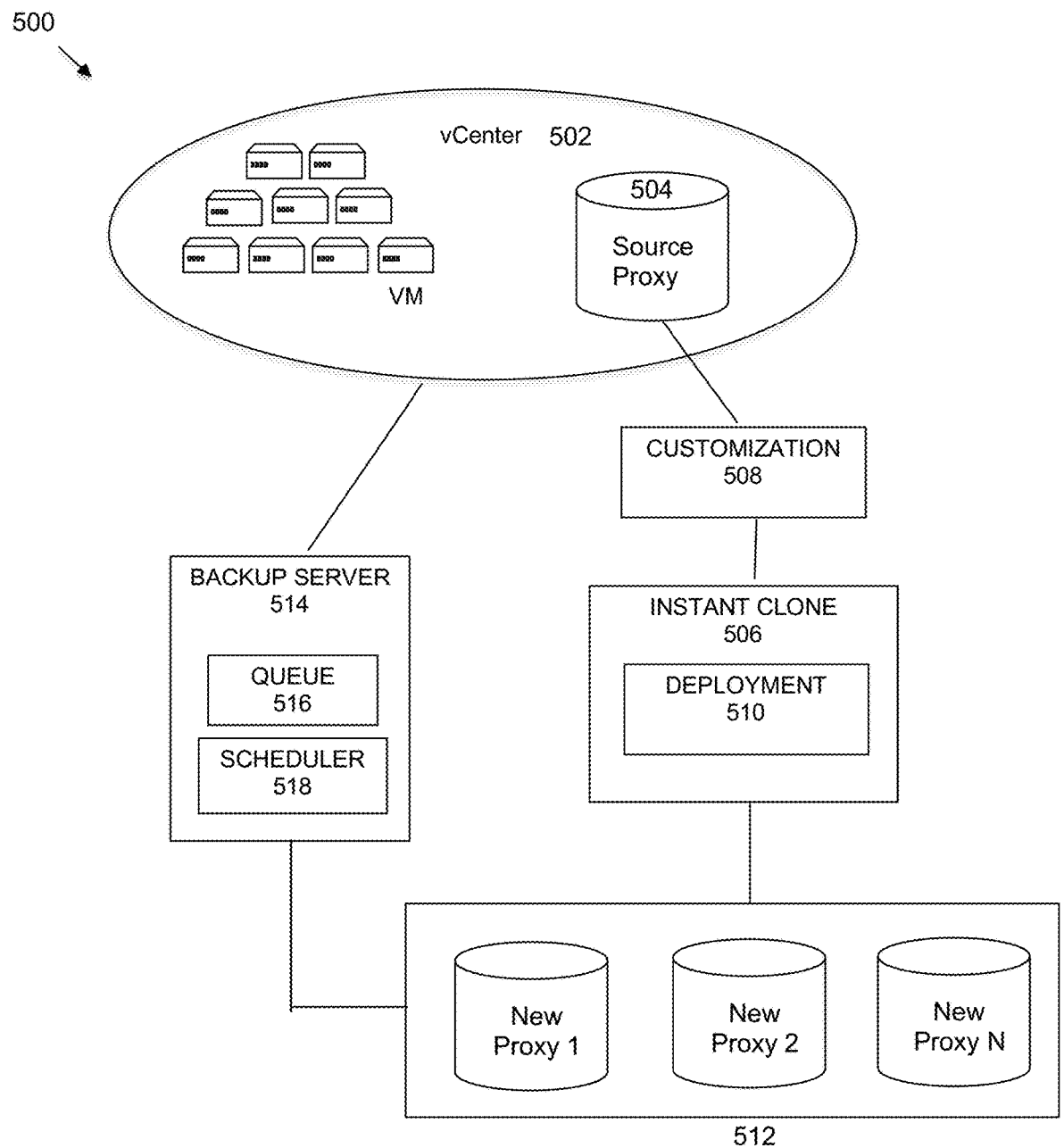
FIG. 5 is a block diagram that illustrates a system for dynamically deploying new proxies from a source proxy, under some embodiments.

FIG. 5 is a block diagram that illustrates a system for dynamically deploying new proxies from a source proxy, under some embodiments. As shown in system 500, a vCenter 502 and first source proxy 504 are deployed for a backup server 514 executing a backup program. Virtual machines for the backup workload are queued in queue 516. If the backup load exceeds the number of available proxies, a scheduler 518 initiates an instant clone process 506 to generate additional proxies. In an embodiment, the instant clone process 506 comprises customization component 508 and deployment component 510 to generate any number N of new proxies 512 for use by the backup server 514. The source proxy 504 acts as the parent proxy for each of the new proxies 512.

In an embodiment, the source proxy 504 comprises a minimum resource VM defined by a template and contains an OS boot disk and subsequent disks that are backups mounted by the backup server 514. The source proxy can be configured as required and can be accessed through appropriate UI tools and search functions. Each new proxy 512 is an exact copy of the source proxy. The only difference being that each proxy will be assigned its own network configuration.

Figure 6:
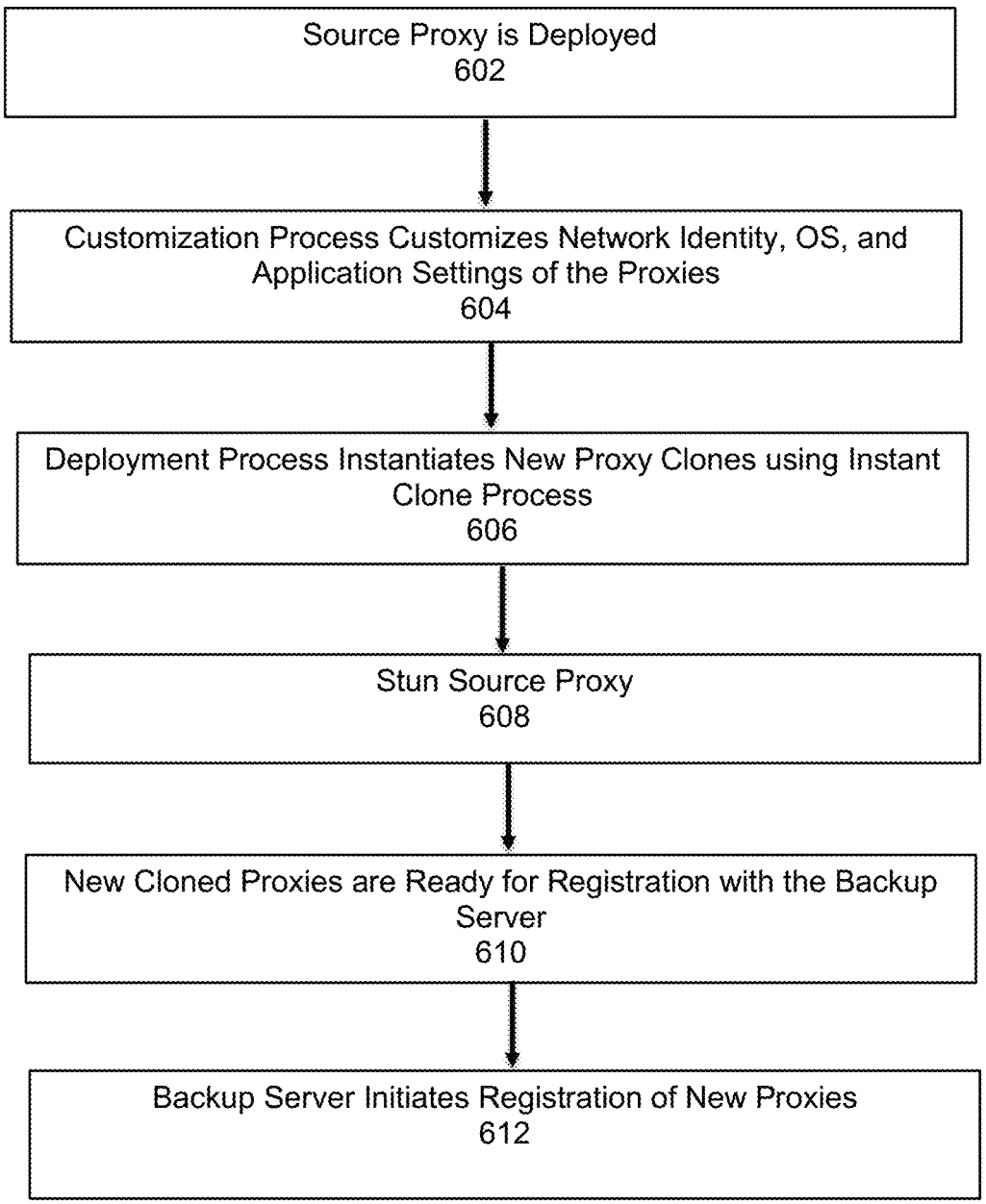
FIG. 6 is a flowchart that illustrates a method of dynamically generating new proxies from a source proxy in an instant clone process, under some embodiments.

FIG. 6 is a flowchart that illustrates a method of dynamically generating new proxies from a source proxy in an instant clone process, under some embodiments. As shown in FIG. 6, the process starts in step 602 with the source vProxy (e.g., proxy 504) already deployed in the virtual center for the backup server. The customization process 508 runs within the vCenter guest OS and is responsible for customizing the network identity, OS and other application settings of the proxy or proxies, step 604. The deployment process 510 runs outside the guest OS and instantiates new instant clones using the vSphere API, in an embodiment, step 606. This API can be consumed by any vSphere 6.7 SDK (software development kit). This process passes in data comprising the network configuration, OS and/or application settings, and so on, to the guest OS of the vCenter 502, which can then be accessed directly by the customization script running within each Instant Clone for actual customization. This process briefly stuns the source proxy 504, step 608. The new spawned proxies are the ready for registration with the backup (e.g., Networker server), step 610, and the backup server initiates a registration process for the new proxies, step 612. In present implementations, this entire process is very quick, typically taking less than 10 seconds, depending on system resources and configuration.

Although embodiments are described with respect to the vSphere platform, embodiments are not so limited and any other similar cloud computing virtualization platform may be used.

The new dynamic deployment proxy system and method makes use of all the available technologies in virtual center to build this solution. It makes use of the instant clone feature available in the vCenter and reconfigures the VMs while performing the cloning operation. This allows multiple proxies to be up and running within well under a minute from determination of need. It provides faster and dynamic provisioning (e.g., 1-10 seconds) of proxy clones, and the new proxies share the physical memory pages and help deliver maximum memory efficiencies which ultimately enables greater consolidation ratios.

Backup System Implementation

Figure 7:
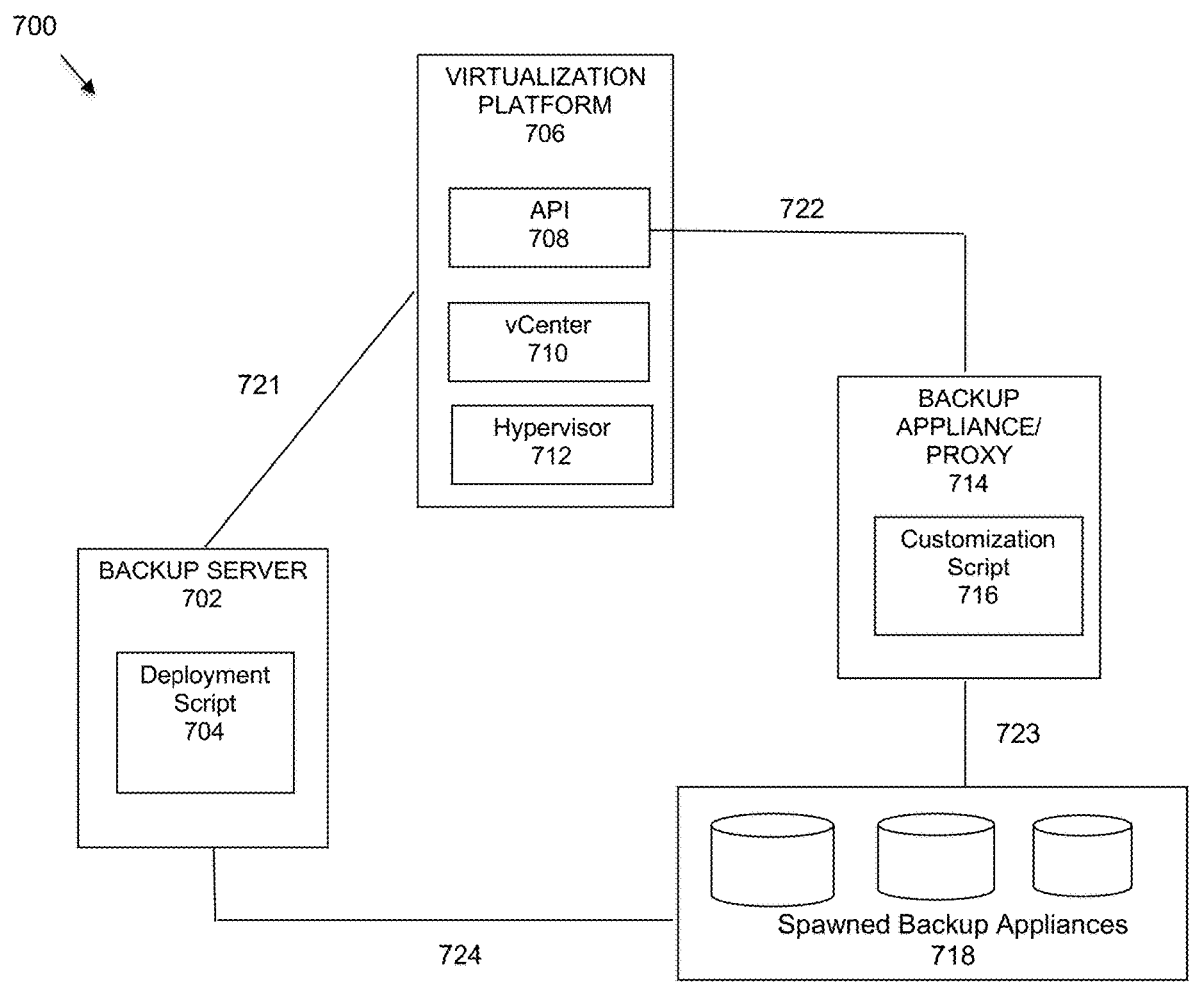
FIG. 7 is a block diagram that illustrates a detailed method of implementing a dynamic proxy generation process in a backup system, under some embodiments.

As stated above, although a system implementing any application can utilize the dynamic multiple proxy generation process, backup applications are especially relevant due to the periodicity of the backup processes and the need to process large and ever-changing workflows in the system. FIG. 7 is a block diagram that illustrates a detailed method of implementing a dynamic proxy generation process in a backup system, under some embodiments. As shown in system 700, backup server 702 detects the need for more backup proxies from a math calculation based on number of backups in its queue and the number of backups each backup appliance can handle parallel. This number is an argument for the Deployment script 704 executed in the backup server. In transaction 721, this number is transmitted to an instant clone process performed in the cloud computing virtualization (e.g., vSphere) platform 706. This platform includes an API 708, a virtual center 710, and a hypervisor 712 managing the VMs in the vCenter 710. The instant clone process is started by the deployment script 704 running from the backup server 702 having the vSphere SDK. The script has steps to invoke the instant clone API 708 and also has the instant clone creation specification or custom metadata. An example for the metadata is the set of hostnames, IP addresses, DNS, Gateway addresses, and so on, which then will be consumed by the customization script 716 in the backup appliance/proxy 714.

The customization provided by customization script 716 is generally required because when a child clone is created, it will receive a new MAC address but because it is inheriting the source VM's OS state and configuration, within the guest OS, the IP address and MAC address is still the same and can cause a network conflict. This can create issues during backup proxy registration with backup server, so the identity of a spawned VM needs to be unique. In transaction 722, the customization script is sent to the parent backup appliance/proxy 714. The customization script contains the list of IP addresses and network configuration information. This will be invoked by the backup server 702 during the Instant clone deployment. This guest specific script will be invoked along with the input parameters (custom metadata) passed on by deployment process and completes the customization process. This script will perform the required customization, like refreshing the guest OS MAC address and assigning a new IP address, Gateway, domain name server (DNS), Hostname, and so on, obtained from the deployment script 704. Thus, the configuration information or application setting information can include IP address list, hostnames defined in the domain name server (DNS), DNS IP address, netmask, and gateway information, among other similar data.

In transaction 723, a new backup appliance or appliances 718 is spawned (e.g., in span of 1-10 seconds), each of which is unique in all means. In transaction 724, the newly created appliance(s) registers with the backup server 702.

As stated above, aspects of an open virtualization program (OVA/OVF) may be used to implement the dynamic multiple proxy deployment process. OVF stands for open virtualization format, and is used for packaging and distributing virtual appliances. The OVF package contains one OVF descriptor (metadata) one or more disk images (like vmdk or vhd), certificate files etc. The entire directory can be distributed as an open virtualization appliance (OVA). With respect to the backup appliance disk, OVA is generally a tar (tape archive) or archive file with the OVF directory inside. The backup appliance or proxy is distributed as an appliance in the form of a .OVA file to the customer. The user must deploy the OVA file for each backup proxy as needed. Although there are automated ways to deploy them, each deployment is still an independent import of disks inside the OVA to the datacenter. This is a time consuming and heavier task when compared to the dynamic solution described herein. Each appliance has a hard limit for parallel backups it can run. So this demands a quick and dynamic way to make new appliance available whenever there are backups in queue. For example, consider a Networker backup proxy having two virtual disks images of 100G and 1G. Deploying a proxy OVA includes importing these virtual disk to the datacenter. This is a heavy task in the case of large number of proxies. The dynamic multi proxy deployment process make this task significantly lighter and more efficient by forking one backup proxy (source or parent) by using an instant clone process. It should be noted that a child proxy cannot be forked again, only the source can be forked.

Although embodiments have been described with respect to network backup comprising certain specific technologies, such as Networker, Instant Clone, and certain backup agents or processes, it should be noted that embodiments are not so limited, and that other backup systems and methods may also utilize the dynamic multiple proxy deployment methods described herein.

As described above, in an embodiment, system 100 includes a multiple vProxy deployment process that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 8:
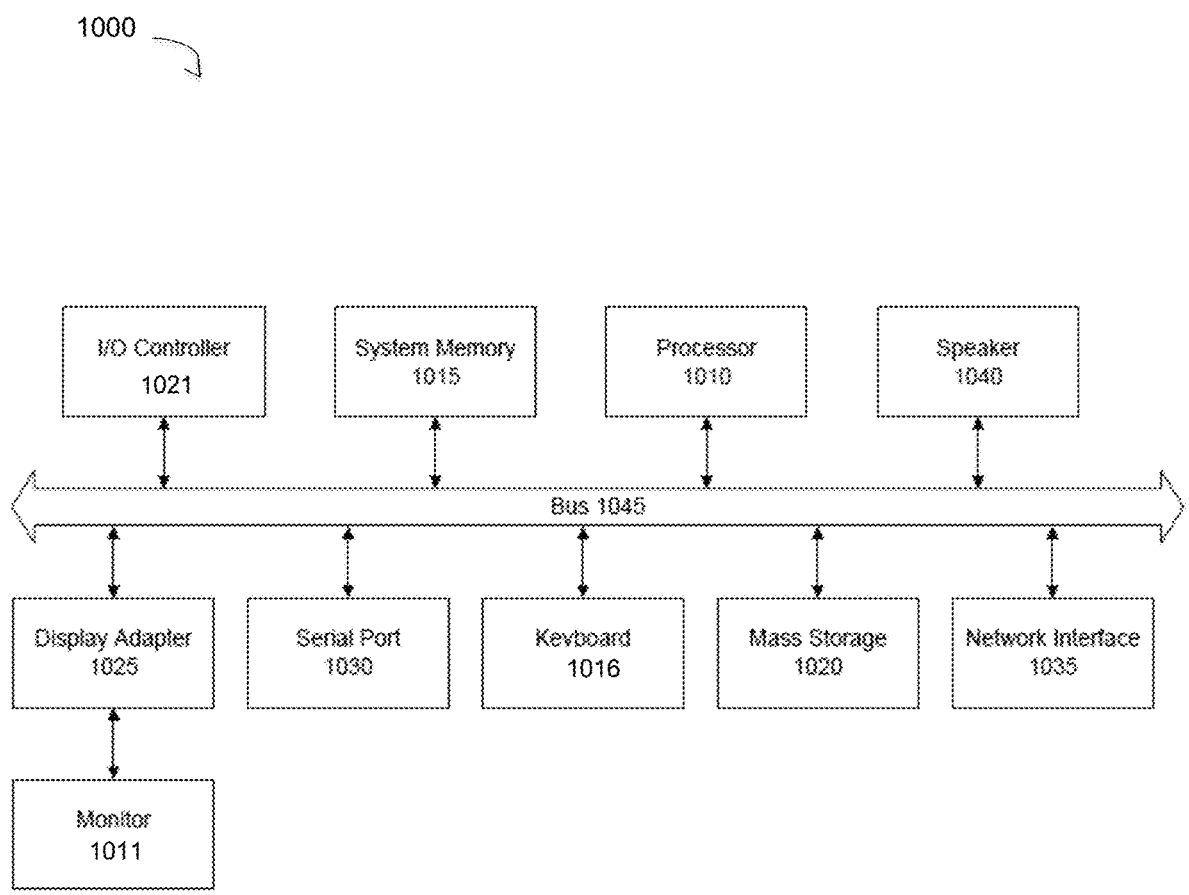
FIG. 8 is a block diagram of a computer system used to execute one or more software components of a system for simultaneous file level recovery using vProxy, under some embodiments.

FIG. 8 is a block diagram of a computer system used to execute one or more software components of a system for dynamic deployment of multiple proxies, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of dynamically generating proxy virtual machines (VMs) in a virtual center (vCenter) serving a backup server, comprising:
deploying a source proxy VM by passing network data to the vCenter;

passing a set of internet protocol (IP) addresses and network configuration information to the vCenter to be used by the dynamically generated proxy VMs;

receiving an indication from the backup server that new proxy VMs are required through a defined prediction formula based on external predefined parameters and a static point-in-time analysis of an infrastructure of the vCenter using a data change rate and a proxy data ingestion rate and based on a number of backups in a backup queue relative to a number of backups that one or more backup appliances can process; and performing, in the vCenter, a parentless instant clone operation to spawn one or more new proxy VMs that share both the memory and disk state of the source proxy VM and that start executing from an exact running state of source proxy VM to perform backup operations of the backup server, wherein the one or more new proxy VMs are spawned based on a number of queued backup operations or backup operation misses or time-outs for the source proxy VM, and wherein a number of spawned proxy VMs is a number required to eliminate source proxy VM queues.

2. The method of claim 1 wherein the external defined parameters comprise a number of VMs in the vCenter, a number of datastores, and a number of VMs hosted in each data store, the method further comprising:

passing the IP address and network configuration information for the new proxy VMs to the backup server for registration within the backup server; and executing a customization script to generate for each of the one or more new proxy VMs configuration information including a guest operating system (OS) media access controller (MAC) address, a unique IP address, a gateway, and a domain name server (DNS).

3. The method of claim 2 further comprising:

receiving a recommendation by the backup server to reduce the number of new proxy VMs; and suspending at least some of the new proxy VMs to release resources used by the at least some of the new proxy VMs.

4. The method of claim 3 further comprising:

receiving a request to increase a number of new proxy VMs; and returning the at least some of the new proxy VMs to an active state.

5. The method of claim 4 wherein the number of new proxy VMs is defined by user input to a proxy deployment manager component executed in the backup server.

6. The method of claim 1 wherein the indication from the backup server that new proxy VMs are required is triggered by one of an overflow of a VM queue in the backup server or an increase in backup workflow based on historic data.

7. The method of claim 1 wherein the network configuration information comprises IP address list, hostnames defined in the domain name server (DNS), DNS IP address, netmask, and gateway information.

8. A system for of dynamically generating proxy virtual machines (VMs) in a virtual center (vCenter) serving a backup server, comprising:

a source proxy VM deployed in the vCenter;

a customization component operating within the guest operating system (OS) of the vCenter and configured to customize data including network identity, OS, and application setting information for configuring one or more new proxies for use by the vCenter, and executing a customization script to generate for each of the one or more new proxy VMs configuration information including the guest OS media access controller (MAC) address, a unique IP address, a gateway, and a domain name server (DNS); and a deployment component operating outside of the guest OS and instantiating the one or more new proxies in response to an indication from the backup server that new proxy VMs are required through a defined prediction formula based on external predefined parameters and a static point-in-time analysis of an infrastructure of the vCenter using a data change rate and a proxy data ingestion rate, and based on a number of backups in a backup queue relative to a number of backups that one or more backup appliances can process, and wherein the new proxies are spawned through a parentless instant clone operation and share both the memory and disk state of the source proxy VM and that start executing from an exact running state of source proxy VM to perform backup operations of the backup server, wherein the one or more new proxy VMs are spawned based on a number of queued backup operations or backup operation misses or time-outs for the source proxy VM, and wherein a number of spawned proxy VMs is a number required to eliminate source proxy VM queues.

9. The system of claim 8 wherein the external defined parameters comprise a number of VMs in the vCenter, a number of datastores, and a number of VMs hosted in each data store, and further comprising a registration component operating in the backup server and configured to register the one or more new proxies.

10. The system of claim 9 further comprising a VM queue in the backup server, and wherein the indication that new proxy VMs are required is triggered by an overflow of the queue by the backup process due to an excessive backup workflow.

11. The system of claim 8 wherein the instantiating of the one or more new proxies is performed by a VMware vSphere application programming interface (API) using a parentless instant clone operation to spawn one or more new proxy VMs that share both the memory and disk state of the source proxy VM.

12. The system of claim 11 wherein the instant clone process is configured to pass IP address and network configuration information for the one or more new proxy VMs to the backup server for the registration within the backup server.

13. The system of claim 8 wherein a number of the one or more new proxy VMs is specified by one of historic VM capacity data, user input to a proxy deployment management (PDM) process, and hardcoded settings in the vCenter.

14. The system of claim 8 wherein the deployment component is further configured to receive a recommendation by the backup server to reduce the number of new proxy VMs; and suspend at least some of the new proxy VMs to release resources used by the at least some of the new proxy VMs.

15. The system of claim 14 wherein the deployment component is further configured to receive a request to increase a number of new proxy VMs; and return the at least some of the new proxy VMs to an active state.

16. The system of claim 8 wherein the application setting information comprises: IP address list, hostnames defined in the DNS, DNS IP address, netmask, and gateway information.

17. A computer program product including executable code that, when executed by a processor, causes a computer to perform a method of dynamically generating proxy virtual machines (VMs) in a virtual center (vCenter) serving a backup server, comprising:

deploying a source proxy VM by passing network data to the vCenter;

passing a set of internet protocol (IP) addresses and network configuration information to the vCenter to be used by the dynamically generated proxy VMs;

receiving an indication from the backup server that new proxy VMs are required through a defined prediction formula based on external predefined parameters and a static point-in-time analysis of an infrastructure of the vCenter using a data change rate and a proxy data ingestion rate and based on a number of backups in a backup queue relative to a number of backups that one or more backup appliances can process; and performing, in the vCenter, a parentless instant clone operation to spawn one or more new proxy VMs that share both the memory and disk state of the source proxy VM and that start executing from an exact running state of source proxy VM to perform backup operations of the backup server, wherein the one or more new proxy VMs are spawned based on a number of queued backup operations or backup operation misses or time-outs for the source proxy VM, and wherein a number of spawned proxy VMs is a number required to eliminate source proxy VM queues.

18. The computer program product of claim 17 wherein the external defined parameters comprise a number of VMs in the vCenter, a number of datastores, and a number of VMs hosted in each data store, and the method further comprises:

passing the IP address and network configuration information for the new proxy VMs to the backup server for registration within the backup server.

19. The computer program product of claim 18 wherein the method further comprises executing a customization script to generate for each of the one or more new proxy VMs configuration information including a guest operating system (OS) media access controller (MAC) address, a unique IP address, a gateway, and a domain name server (DNS).

* * * * *